(12) United States Patent
Iwamoto et al.

(10) Patent No.: US 9,829,834 B2
(45) Date of Patent: Nov. 28, 2017

(54) FLYWHEEL AND IMAGE FORMING APPARATUS

(71) Applicant: FUJI XEROX Co., Ltd., Tokyo (JP)

(72) Inventors: Kentaro Iwamoto, Kanagawa (JP); Kazuyoshi Hagiwara, Kanagawa (JP); Akira Takahashi, Kanagawa (JP); Mihoko Tanaka, Kanagawa (JP); Arichika Tanaka, Kanagawa (JP); Yusuke Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/207,654

(22) Filed: Jul. 12, 2016

(65) Prior Publication Data
US 2017/0261889 A1    Sep. 14, 2017

(30) Foreign Application Priority Data
Mar. 10, 2016 (JP) ................................ 2016-047263

(51) Int. Cl.
*G03G 15/16* (2006.01)
*F16F 15/315* (2006.01)

(52) U.S. Cl.
CPC ..... *G03G 15/1615* (2013.01); *F16F 15/3153* (2013.01)

(58) Field of Classification Search
CPC .................. G03G 15/1615; F16F 15/3153
USPC ................... 399/159, 162, 303, 313
See application file for complete search history.

(56) References Cited

U.S. PATENT DOCUMENTS

| 6,212,345 | B1 * | 4/2001 | Harada | G03G 15/0194 399/159 |
| 2004/0127317 | A1 * | 7/2004 | Takuroh | G03G 15/161 474/117 |
| 2013/0189003 | A1 * | 7/2013 | Yu | G03G 15/0189 399/313 |
| 2013/0223902 | A1 * | 8/2013 | Oishi | G03G 15/1615 399/313 |

FOREIGN PATENT DOCUMENTS

| JP | 10-063059 A | 3/1998 |
| JP | 2000-066469 A | 3/2000 |

* cited by examiner

*Primary Examiner* — Sandra Brase
(74) *Attorney, Agent, or Firm* — Sughrue Mion, PLLC (57) ABSTRACT

A flywheel includes a rotation shaft, a flywheel body, and a protruding body. A first end of the rotation shaft is supported by a rotating body. The flywheel body is provided at a second end of the rotation shaft and rotates together with the rotation shaft. The protruding body protrudes from a surface at a rotating-body side of the flywheel body and extends in a circumferential direction of the rotation shaft.

6 Claims, 5 Drawing Sheets

FLYWHEEL AND IMAGE FORMING APPARATUS

CROSS-REFERENCE TO RELATED APPLICATIONS

This application is based on and claims priority under 35 USC 119 from Japanese Patent Application No. 2016-047263 filed Mar. 10, 2016.

BACKGROUND

Technical Field

The present invention relates to flywheels and image forming apparatuses.

SUMMARY

According to an aspect of the invention, there is provided a flywheel including a rotation shaft, a flywheel body, and a protruding body. A first end of the rotation shaft is supported by a rotating body. The flywheel body is provided at a second end of the rotation shaft and rotates together with the rotation shaft. The protruding body protrudes from a surface at a rotating-body side of the flywheel body and extends in a circumferential direction of the rotation shaft.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the appended drawings.

Figure 1:
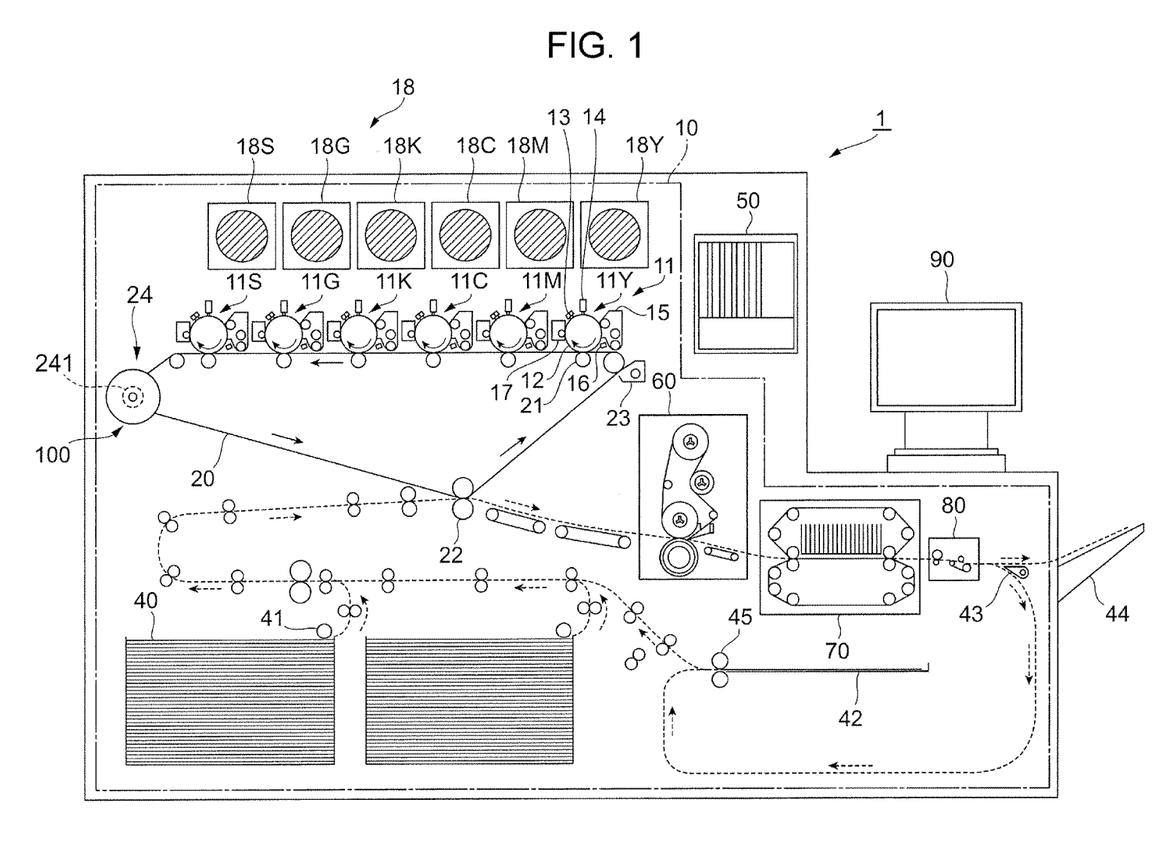
FIG. 1 illustrates the overall configuration of an image forming apparatus according to an exemplary embodiment.

FIG. 1 illustrates the overall configuration of an image forming apparatus 1 according to an exemplary embodiment.

Configuration of Image Forming Apparatus 1

The image forming apparatus 1 shown in FIG. 1 is a so-called tandem-type color printer. The image forming apparatus 1 includes an image forming section 10 that forms an image based on image data, a controller 50 that controls the operation of the entire image forming apparatus 1, communicates with, for example, a personal computer (PC), and performs, for example, image processing on the image data, and a user interface 90 (referred to as "UI 90" hereinafter) that receives an operation input by a user and displays various kinds of information.

Image Forming Section 10

The image forming section 10 forms an image based on, for example, electrophotography.

The image forming section 10 includes image forming units 11 that form toner images and also includes toner containers 18 that contain therein toners of respective colors.

Furthermore, the image forming section 10 includes an intermediate transfer belt 20, multiple first-transfer rollers 21, and a driving roller 24 as an example of a rotating device.

In addition, the image forming section 10 includes a second-transfer roller 22 that collectively transfers (i.e., second-transfers) toner images of respective colors superposed and transferred on the intermediate transfer belt 20 onto a sheet serving as a recording medium, a belt cleaner 23 that cleans the surface of the intermediate transfer belt 20 after the transfer process (i.e., second-transfer process), and a fixing unit 60 that fixes the second-transferred toner images onto the sheet.

Moreover, the image forming section 10 includes a cooling unit 70 that facilitates the fixing process by cooling the toner images fixed on the sheet by the fixing unit 60 and also includes a curl correcting unit 80 that corrects curling (bending) of the sheet cooled by the cooling unit 70.

Furthermore, as a transport system, the image forming section 10 includes multiple sheet containers 40 that accommodate sheets therein, a fetching roller 41 that fetches a sheet accommodated in one of the sheet containers 40, an intermediate sheet container 42 that temporarily retains the sheet having toner images fixed on a first face thereof by the fixing unit 60, a distributing mechanism 43 that selectively distributes the sheet to a transport path, a sheet load section 44 on which the sheet distributed by the distributing mechanism 43 is loaded, and a fetching roller 45 that fetches and transports the sheet accommodated in the intermediate sheet container 42.

The image forming units 11 include six image forming units 11Y, 11M, 11C, 11K, 11G, and 11S that are arranged side-by-side.

Each image forming unit 11 includes a photoconductor drum 12, a charging unit 13 that electrostatically charges the photoconductor drum 12 to a predetermined potential, an exposure unit 14 that forms an electrostatic latent image onto the photoconductor drum 12 electrostatically charged by the charging unit 13, a developing unit 15 that develops the electrostatic latent image formed on the photoconductor drum 12 by using the toner of the corresponding color, a light-intensity measuring unit 16 having a light source that emits light onto the photoconductor drum 12 and a light receiver that receives the light reflected therefrom, and a drum cleaner 17 that cleans the surface of the photoconductor drum 12 after the transfer process.

The toner containers 18 include toner containers 18Y, 18M, 18C, 18K, 18G, and 18S that contain the toners therein. The toner containers 18 are coupled to the developing units 15 for the corresponding colors and supply the toners of the corresponding colors to the developing units 15.

The intermediate transfer belt 20 is a transfer target for the toner images formed on the photoconductor drums 12 of the respective image forming units 11.

The first-transfer rollers 21 transfer (first-transfer) the toner images formed on the photoconductor drums 12 of the respective image forming units 11 onto the intermediate transfer belt 20.

The driving roller 24 drives the intermediate transfer belt 20 by applying a driving force thereto.

The driving roller 24 serves as an example of a rotating device and includes a driving roller body 241 as an example of a rotating body and a flywheel 100 that stabilizes the rotation (movement) of the driving roller body 241 by using an inertial force.

The driving roller body 241 comes into contact with the intermediate transfer belt 20 so as to transmit a driving force to the intermediate transfer belt 20. An additional description of the flywheel 100 will be provided later.

In the following description, the side closer to an operator operating the image forming apparatus 1 shown in FIG. 1 may be referred to as "front side", and the side far from the operator may be referred to as "rear side". The depth direction of the image forming apparatus 1 shown in FIG. 1 may simply be referred to as "front-rear direction", and the height direction of the image forming apparatus 1 may simply be referred to as "up-down direction".

Operation of Image Forming Apparatus 1

Image Forming Operation

Next, the basic image forming operation performed in the image forming apparatus 1 according to this exemplary embodiment will be described.

The image forming units 11 of the image forming section 10 form toner images of the respective colors in accordance with an electrophotographic process. The toner images formed in the image forming units 11 are sequentially first-transferred onto the intermediate transfer belt 20 by the first-transfer rollers 21.

Thus, a combined toner image having the toners of the respective colors superposed thereon is formed on the intermediate transfer belt 20. The intermediate transfer belt 20 transports the combined toner image on the intermediate transfer belt 20 to a second-transfer region where the second-transfer roller 22 is disposed.

Sheet Transport Operation

In the sheet transport system, a sheet is fetched from one of the multiple sheet containers 40 by the corresponding fetching roller 41 in accordance with the timing at which image formation commences in the image forming units 11, and is transported to the second-transfer region.

In the second-transfer region, the combined toner image on the intermediate transfer belt 20 is collectively second-transferred onto the sheet.

Subsequently, the sheet having the combined toner image transferred thereon is transported to the fixing unit 60. The combined toner image on the transported sheet undergoes a fixing process performed by the fixing unit 60 so as to become fixed onto the sheet. The sheet having the fixed image formed thereon is cooled by the cooling unit 70 and then undergoes a curl correcting process performed by the curl correcting unit 80. Then, the sheet is guided to a single-face printing or double-face printing transport path by the distributing mechanism 43.

In a case where the sheet is guided to the single-face printing transport path, the sheet is transported toward the sheet load section 44.

In a case where the sheet is guided to the double-face printing transport path, the sheet having the image formed on the first face thereof is transported toward the intermediate sheet container 42. The sheet is then fetched from the intermediate sheet container 42 in accordance with the timing at which image formation on the second face of the sheet commences in the image forming units 11. The fetched sheet is transported to the second-transfer region where the combined toner image on the second face is collectively second-transferred onto the sheet.

Then, the sheet having the toner images transferred on both faces thereof travels through the fixing unit 60, the cooling unit 70, and the curl correcting unit 80 and is subsequently transported toward the sheet load section 44 by the distributing mechanism 43.

Configuration of Flywheel 100

Figure 2A:
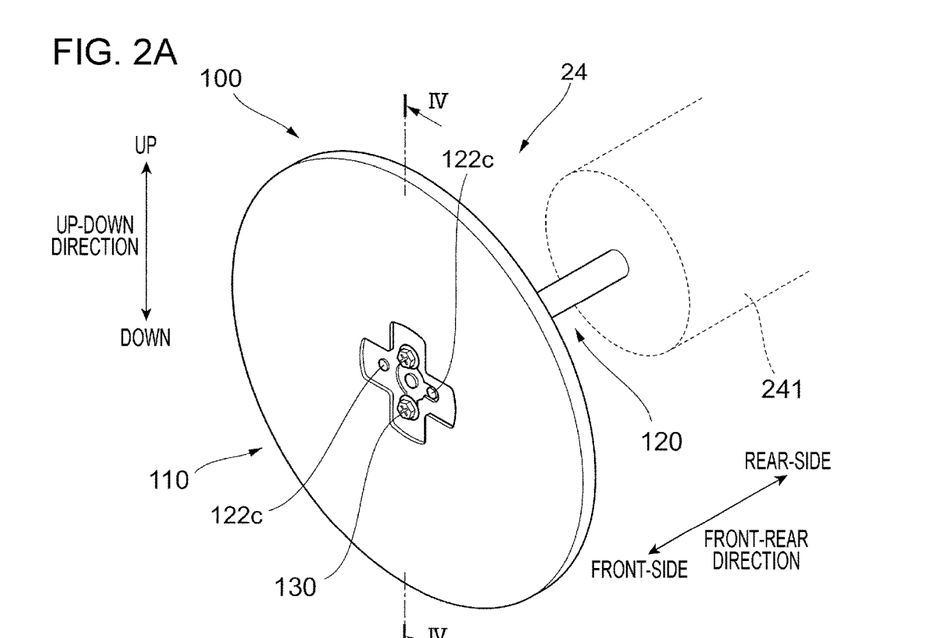
FIGS. 2A and 2B are perspective views illustrating the configuration of a flywheel according to this exemplary embodiment.
Figure 2B:
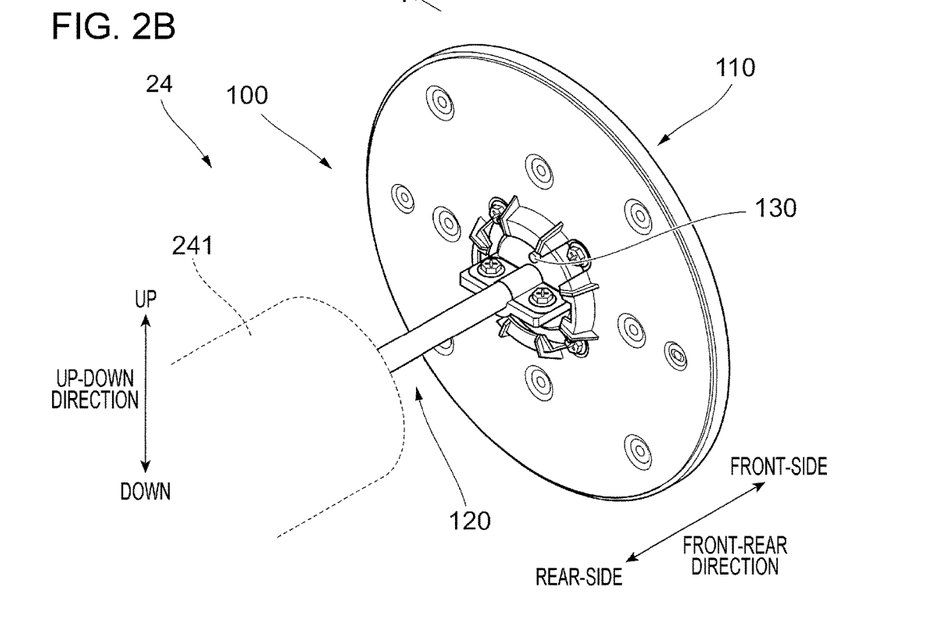

FIGS. 2A and 2B are perspective views illustrating the configuration of the flywheel 100 according to this exemplary embodiment. FIG. 2A illustrates the flywheel 100 according to this exemplary embodiment, as viewed from the front side in the front-rear direction. FIG. 2B illustrates the flywheel 100 according to this exemplary embodiment, as viewed from the rear side in the front-rear direction.

Next, the configuration of the flywheel 100 according to this exemplary embodiment will be described with reference to FIGS. 2A and 2B.

The flywheel 100 is attached coaxially with the driving roller body 241 to the front side of the driving roller body 241. Specifically, the flywheel 100 is disposed on the same rotation shaft as the driving roller body 241.

In the following description, the circumferential direction of the flywheel 100 in the state shown in FIGS. 2A and 2B may simply be referred to as "circumferential direction".

The flywheel 100 includes a flywheel body 110, a rotation shaft 120 provided at the rear side of the flywheel body 110, and coupling bolts 130 that couple the flywheel body 110 and the rotation shaft 120 to each other.

The flywheel body 110 is formed by stacking multiple substantially disk-shaped members composed of metal or resin. The flywheel body 110 shown in FIGS. 2A and 2B has an outer diameter larger than that of the driving roller body 241.

The rotation shaft 120 as an example of a rotation shaft is, for example, a substantially columnar member composed of metal.

The rotation shaft 120 has a first end secured to the driving roller body 241 and a second end secured to the flywheel body 110. The flywheel body 110 is attached to the second end of the rotation shaft 120 by using the coupling bolts 130 (two bolts in the example shown in FIGS. 2A and 2B).

Operation of Flywheel 100

The flywheel 100 rotates together with the driving roller body 241. In this case, the moment of inertia of the flywheel 100 stabilizes the rotation (movement) of the driving roller body 241.

Specifically, the driving roller body 241 is provided with the flywheel 100, which has a certain weight, so that a change in the rotational speed of the driving roller body 241 may be reduced even when, for example, the driving roller 24 receives disturbance (such as fluctuations in torque).

Flywheel Body 110 and Rotation Shaft 120

Figure 3:
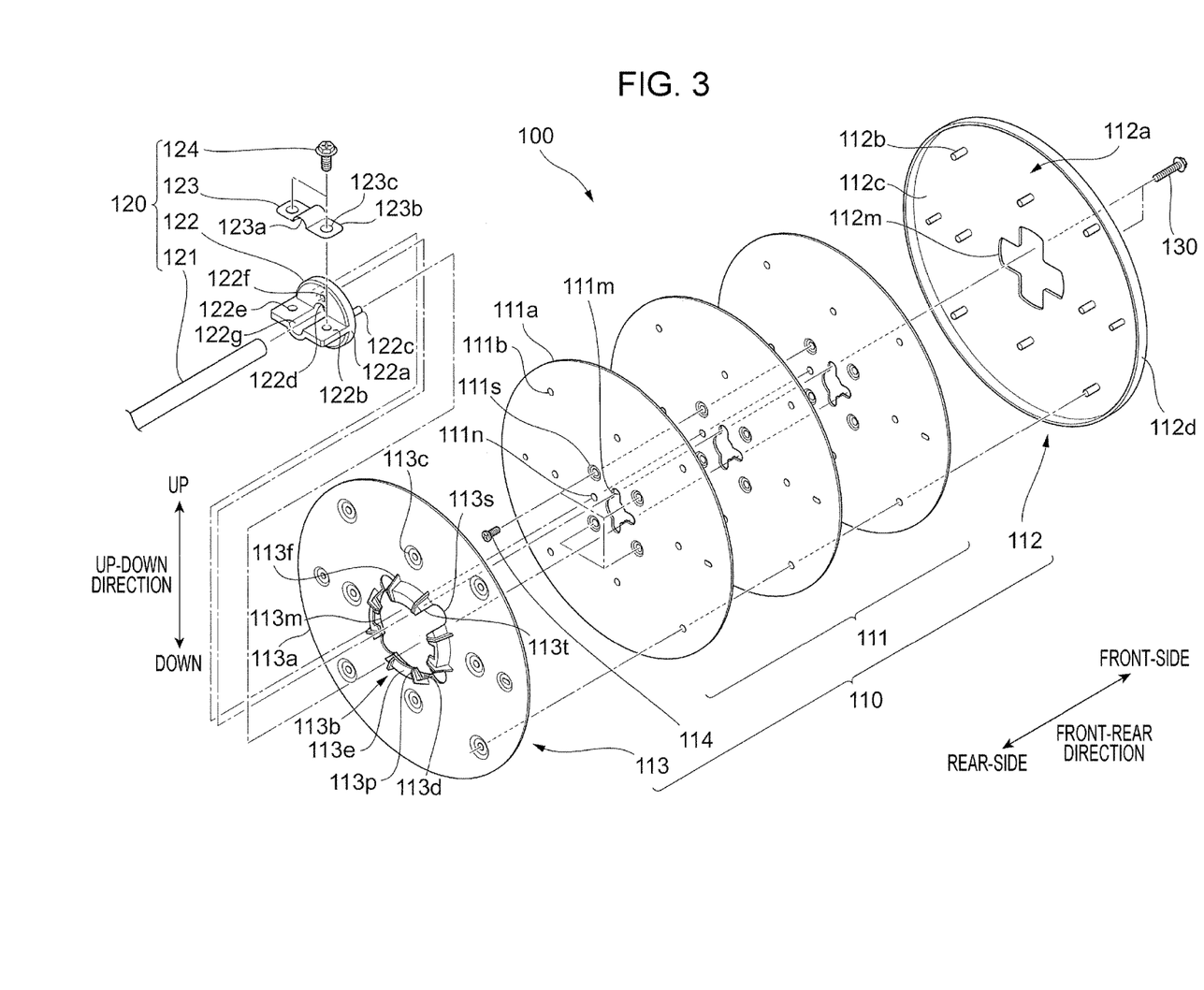
FIG. 3 is an exploded view illustrating a flywheel body and a rotation shaft according to this exemplary embodiment.
Figure 4:
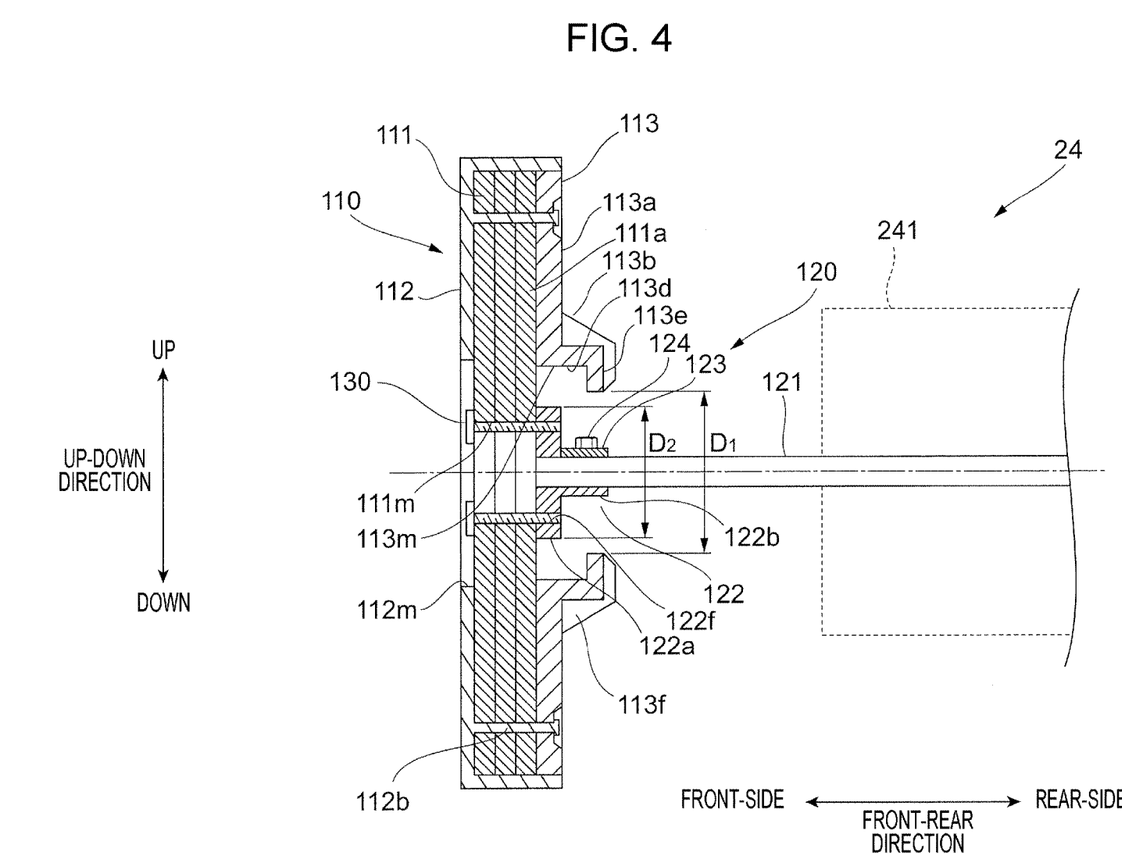
FIG. 4 is a cross-sectional view illustrating the flywheel body and the rotation shaft according to this exemplary embodiment.

FIG. 3 is an exploded view illustrating the flywheel body 110 and the rotation shaft 120 according to this exemplary embodiment. FIG. 4 is a cross-sectional view taken along line IV-IV in FIG. 2A, illustrating the flywheel body 110 and the rotation shaft 120 according to this exemplary embodiment.

Next, the flywheel body 110 and the rotation shaft 120 according to this exemplary embodiment will be described in detail with reference to FIGS. 2A to 4.

The configuration of the flywheel body 110, the configuration of the rotation shaft 120, the assembly of the flywheel body 110, and the assembly of the rotation shaft 120 will be described first, and the assembly of the flywheel 100 will be subsequently described.

Configuration of Flywheel Body 110

The flywheel body 110 includes a body section 111, a cover section 112 that covers the body section 111, a sandwiching section 113 that, together with the cover section 112, sandwiches the body section 111, and body securing bolts 114.

In the following description, the cover section 112 will be described first, and the body section 111 and the sandwiching section 113 will be subsequently described.

The cover section 112 is a disk member composed of resin.

The cover section 112 includes a recess 112a formed in one plate surface thereof, protrusions 112b provided within the recess 112a, and an assembly hole 112m extending through the plate surface.

The recess 112a is a space defined by a circular base 112c and a cylindrical wall 112d surrounding the base 112c.

The protrusions 112b are substantially columnar members protruding from the base 112c toward the rear side. Multiple protrusions 112b are provided (ten protrusions in the example shown in the drawings).

These protrusions 112b are metallic members provided for securing the body section 111 and function as so-called rivets. The protrusions 112b in the drawings have a larger height than the wall 112d. Specifically, the protrusions 112b protrude more toward the rear side than the wall 112d.

The assembly hole 112m is formed in the central area of the recess 112a. The assembly hole 112m in the example shown in the drawings is substantially cross-shaped.

The body section 111 as an example of a flywheel body section, a flywheel body, and a securing section is a disk-shaped member. In the example shown in FIG. 3, the body section 111 is formed by stacking multiple (three) metal plates 111a, which are metallic disk-shaped members. These metal plates 111a are fixed to one another by using the body securing bolts 114.

Each metal plate 111a has a diameter smaller than the inner diameter of the recess 112a. Furthermore, the plate surface of each metal plate 111a is provided with protrusion holes 111b (ten holes) into which the protrusions 112b are inserted, threaded holes 111s (four holes) to which the body securing bolts 114 are bolted, an assembly hole 111m (one hole) into which a securing pin 122c (to be described later) and the coupling bolts 130 are inserted, and an assembly hole 111n (one hole) into which another securing pin 122c is inserted.

The assembly hole 111m in the example shown in the drawings is a substantially T-shaped hole.

The sandwiching section 113 is a disk-shaped member composed of resin. The sandwiching section 113 includes a disk 113a and a claw 113b as an example of a protruding body protruding from one surface of the disk 113a (i.e., the rear surface in the example shown in the drawings).

The disk 113a is a disk-shaped member and has a diameter smaller than the inner diameter of the recess 112a. Furthermore, the plate surface of the disk 113a is provided with protrusion holes 113c (ten holes) into which the protrusions 112b are inserted, clearance holes 113s (four holes) into which the heads of the body securing bolts 114 are inserted, and an assembly hole 113m (one hole) into which a flange 122 is inserted.

In the example shown in FIG. 3, the protrusion holes 113c each have a step such that the diameter at the front side increases. Specifically, each protrusion hole 113c is a so-called counter-sunk hole that is counter-sunk at the front side (i.e., the claw 113b side).

The claw 113b as an example of a protruding body and a hooking section is formed around the outer periphery of the assembly hole 113m in one surface of the disk 113a.

The claw 113b has substantially equally-spaced cutouts 113t at multiple (four) locations in the circumferential direction. These cutouts 113t extend continuously to the respective clearance holes 113s. The segments of the claw 113b separated from one another in the circumferential direction by the cutouts 113t may sometimes be referred to as "claw segments 113p" hereinafter.

The claw 113b may be regarded as a substantially cylindrical member provided around the assembly hole 113m. The inner diameter of the front end of this substantially cylindrical member corresponds to the assembly hole 113m. The inner diameter of the rear end is larger than the outer diameter of the flange 122. Moreover, the inner diameter of the rear end is smaller than the inner diameter of the front end.

The claw 113b includes a wall 113d, a protrusion 113e extending continuously from the wall 113d, and ribs 113f provided at the outer peripheral surface of the protrusion 113e and the wall 113d.

The wall 113d as an example of an upright section protrudes upright around the outer periphery of the assembly hole 113m from the rear surface of the disk 113a. In other words, the wall 113d is a cylindrical member.

The protrusion 113e as an example of an extending section is provided at the rear edge of the wall 113d and protrudes radially inward from this edge. An inner diameter D1 of the protrusion 113e is larger than an outer diameter D2 of the flange 122.

The ribs 113f extend from the radially-outer surface of the wall 113d to the rear surface of the protrusion 113e.

The ribs 113f increase the rigidity of the wall 113d and the protrusion 113e. In the example shown in FIG. 3, multiple (eight) ribs 113f are provided. The claw segments 113p each have the ribs 113f at the ends thereof in the circumferential direction.

Configuration of Rotation Shaft 120

The rotation shaft 120 includes a shaft body 121 whose one end is secured to the driving roller body 241, the flange 122 that secures the rotation shaft 120 to the flywheel body 110, a presser plate 123 that presses the shaft body 121 against the flange 122, and shaft securing bolts 124 (two bolts) that secure the presser plate 123.

The shaft body 121 is a substantially columnar member formed of, for example, a metallic rod.

The flange 122 as an example of a large diameter section is a substantially columnar member composed of, for example, metal. The flange 122 includes a disk 122a that secures the rotation shaft 120 to the flywheel body 110, a shaft supporter 122b that supports and secures the shaft body 121, and positioning securing pins 122c that position the flange 122 relative to the flywheel body 110.

The disk 122a is provided with a shaft hole 122d as a through-hole in the center of the plate surface into which the shaft body 121 is inserted, and is also provided with coupling threaded holes 122f (two holes) to which the coupling bolts 130 are bolted when the disk 122a is coupled to the flywheel body 110.

The shaft supporter 122b is a plate-shaped member and protrudes upright from the rear surface of the disk 122a. The shaft supporter 122b is provided with a groove 122g that receives the shaft body 121. The opposite sides of the groove 122g in the shaft supporter 122b are respectively provided with threaded holes 122e (two holes) for the shaft securing bolts 124.

The presser plate 123 is, for example, a metal plate. The central area of the presser plate 123 is provided with a groove 123a that receives the shaft body 121. The opposite sides of the groove 123a are respectively provided with through-holes 123b (two holes) for the shaft securing bolts 124.

Assembly of Flywheel Body 110

The assembly of the flywheel body 110 will be described below.

First, the body section 111 is assembled. In detail, in a state where the three metal plates 111a are stacked, the body securing bolts 114 are bolted and secured to the threaded holes 111s. Then, the protrusions 112b of the cover section 112 are inserted into the protrusion holes 111b of the body section 111. Consequently, the body section 111 is covered by the cover section 112.

Subsequently, the sandwiching section 113 is installed from the rear side of the body section 111.

In detail, the protrusions 112b of the cover section 112 protruding from the rear side of the body section 111 are inserted into the protrusion holes 113c of the sandwiching section 113. Then, in a state where the sandwiching section 113 is pressed against the body section 111, portions of the protrusions 112b that protrude from the protrusion holes 113c are smashed (deformed). Consequently, the tip ends of the protrusions 112b protruding from the protrusion holes 113c are increased in diameter. As a result, the sandwiching section 113 is secured to the body section 111 and the cover section 112.

Accordingly, the flywheel body 110 is assembled.

Assembly of Rotation Shaft 120

First, the tip end of the shaft body 121 is inserted into the shaft hole 122d of the flange 122. In this state, the shaft body 121 is disposed within the groove 122g. Then, the groove 123a of the presser plate 123 is pressed against the shaft body 121. Subsequently, the presser plate 123 is secured to the shaft supporter 122b of the flange 122 by using the shaft securing bolts 124.

Accordingly, the rotation shaft 120 is assembled.

Assembly of Flywheel 100

The flywheel 100 is assembled in accordance with, for example, the following procedure while using the flywheel body 110 and the rotation shaft 120 assembled in the above-described manner. It is assumed that the rotation shaft 120 is secured to the driving roller body 241.

First, the securing pins 122c of the rotation shaft 120 are inserted into the corresponding assembly holes 111m and 111n of the flywheel body 110. Consequently, the rear surface of the flywheel body 110 is pressed against the flange 122 of the rotation shaft 120.

Subsequently, the coupling bolts 130 (two bolts) are inserted into the assembly hole 112m of the cover section 112. The coupling bolts 130 extend through the assembly hole 112m of the cover section 112, the assembly hole 111m of the body section 111, and the assembly hole 113m of the sandwiching section 113. Then, the tip ends of the coupling bolts 130 are bolted to the coupling threaded holes 122f of the flange 122. As a result, the flywheel body 110 is sandwiched and secured between the flange 122 and the heads of the coupling bolts 130, as shown in FIG. 4.

Accordingly, the flywheel 100 is assembled.

Fall Prevention of Flywheel Body 110

Figure 5:
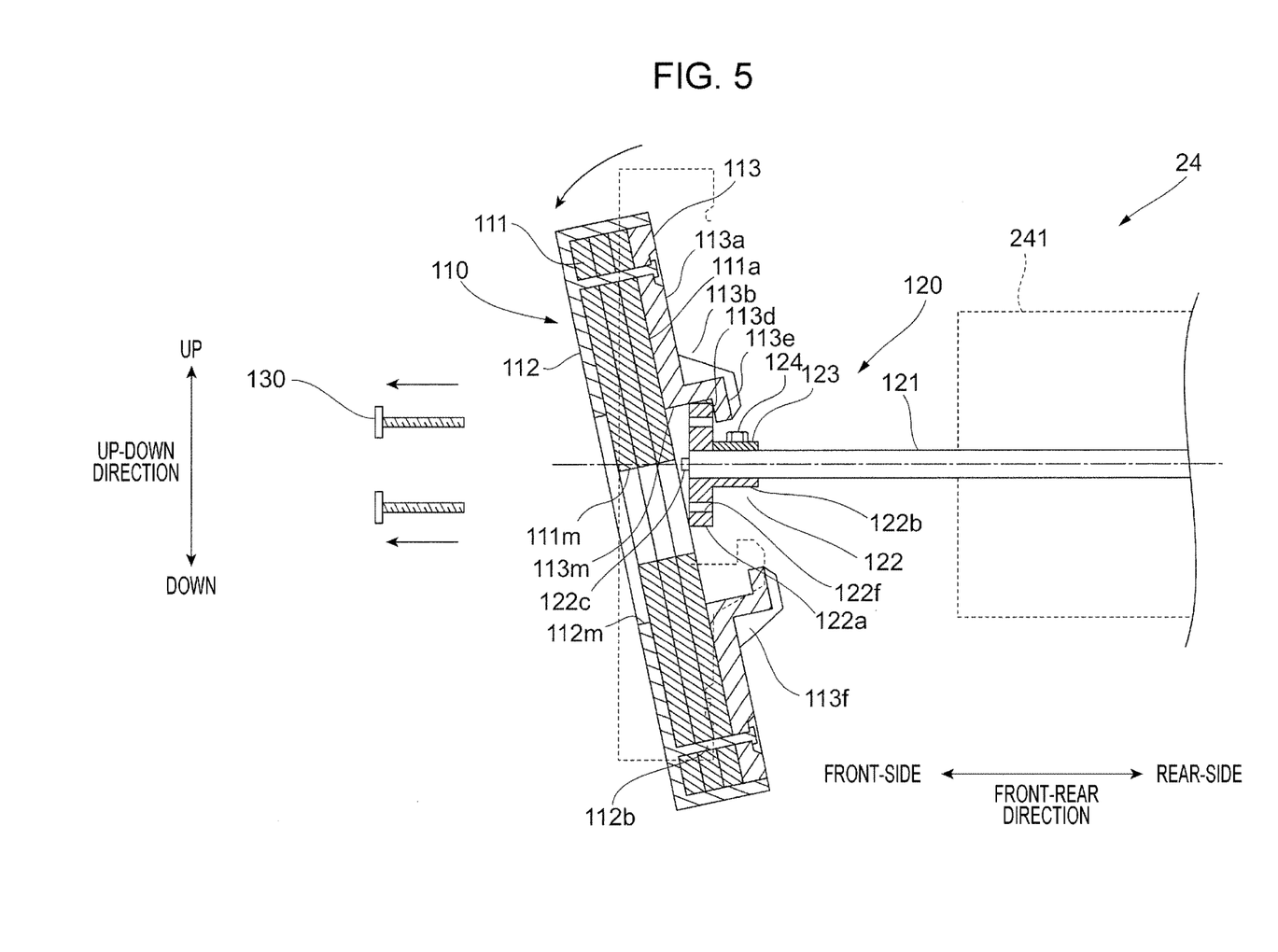
FIG. 5 is a cross-sectional view illustrating a state where the flywheel body according to this exemplary embodiment is hooked to the rotation shaft.

FIG. 5 is a cross-sectional view illustrating a state where the flywheel body 110 according to this exemplary embodiment is hooked to the rotation shaft 120.

Next, the state where the flywheel body 110 is hooked to the rotation shaft 120 will be described in detail with reference to FIG. 5.

With regard to the flywheel body 110 assembled in the above-described manner, for example, there are situations where the flywheel body 110 is removed from the rotation shaft 120 when performing maintenance, such as replacing the flywheel body 110 or replacing the intermediate transfer belt 20 (see FIG. 1).

More specifically, the flywheel body 110 has an outer diameter larger than that of the driving roller body 241. For example, when performing a process on the driving roller body 241 located at the rear side of the flywheel body 110, the flywheel body 110 becomes a hindrance to that process. Therefore, a working space for the driving roller body 241 has to be ensured by removing the flywheel body 110.

When removing the flywheel body 110, the coupling bolts 130 are pulled out from the front side. Thus, while the rotation shaft 120 is maintained in a secured state to the driving roller body 241, the flywheel body 110 and the rotation shaft 120 are uncoupled from each other, so that the flywheel body 110 becomes movable.

Furthermore, as shown in FIG. 5, since the center of gravity of the flywheel body 110 with reference to the flange 122 is positioned toward the front side relative to the disk 122a of the flange 122 in the front-rear direction, the upper edge of the flywheel body 110 tilts toward the front side (see the arrow shown in FIG. 5).

In other words, the flywheel body 110 rotates (counter-clockwise in FIG. 5) due to gravity.

Accordingly, since the flywheel body 110 becomes movable, for example, if the operator removes the coupling bolts 130 without holding the flywheel body 110, the flywheel body 110 may fall due to gravity.

In this exemplary embodiment, the claw 113b, which is a part of the flywheel body 110, is hooked to the rotation shaft 120 so that the flywheel body 110 may be prevented from falling even when the coupling bolts 130 are removed.

In detail, the claw 113b is hooked to the flange 122 of the rotation shaft 120.

More specifically, the front-facing surface of the protrusion 113e (i.e., the surface thereof facing toward the inner side of the claw 113b) of the claw 113b comes into contact with the front end surface of the disk 122a.

Moreover, the inner peripheral surface of the wall 113d of the claw 113b comes into contact with (i.e., abuts on) the outer peripheral surface of the disk 122a.

Furthermore, the flywheel body 110 (i.e., the plate surface of the metal plates 111a) abuts on the lower edge of the disk 122a of the flange 122.

Thus, the flywheel body 110 is hooked to the rotation shaft 120 so as to be prevented from falling. Moreover, due to the support by the lower edge of the disk 122a, rotation of the flywheel body 110 may be suppressed. As a result, the position of the flywheel body 110 is stabilized.

As described above, the inner diameter D1 (see FIG. 4) of the protrusion 113e is made larger than the outer diameter D2 of the disk 122a of the flange 122 so that the falling flywheel body 110 is allowed to tilt toward the front side. This allows the flywheel body 110 to be readily hooked to the rotation shaft 120.

Furthermore, for example, if the flywheel 100 is provided at a high position, such as above the operator's head, the insertion process of the coupling bolts 130 may be performed after hooking the flywheel body 110 to the rotation shaft 120 during installation. This may facilitate the process for attaching the flywheel body 110 to the rotation shaft 120.

Modifications

Although the inner diameter of the protrusion 113e is described above as being larger than the outer diameter of the flange 122, for example, this inner diameter may be made the same as or smaller than the outer diameter of the flange 122.

Furthermore, although the claw 113b is described as having the cutouts 113t, a configuration in which the claw 113b does not have the cutouts 113t is also permissible.

Furthermore, although the claw 113b is described as being substantially cylindrical, the claw 113b may be formed along the outer periphery of the assembly hole 113m. For example, the claw 113b may be multiple protrusions formed at the rear surface of the disk 113a along the outer periphery of the assembly hole 113m, that is, in the circumferential direction.

Furthermore, although the claw 113b is described as having the wall 113d and the protrusion 113e, for example, a configuration in which the claw 113b does not have the protrusion 113e is also permissible.

Furthermore, the shape of the wall 113d is not limited to the cylindrical shape and may alternatively be another shape, such as a circular truncated conical shape (tapered shape) or semispherical shape (dome shape) having a through-hole. In this case, in the tapered-shaped or dome-shaped configuration, the opening at the tip end oriented toward the rotation shaft 120 has to be formed smaller than the outer diameter D2 of the flange 122.

Furthermore, although the protrusions 112b are described as being parts of the cover section 112, for example, the protrusions 112b may be separate components from the cover section 112.

Furthermore, although the body section 111 is described as having the cover section 112 in the example shown in the drawings, the body section 111 does not have to have the cover section 112.

Furthermore, although the flywheel body 110 is described as being formed of multiple components, the flywheel body 110 may be formed as a single unit.

Furthermore, although the flywheel body 110 is described as being a disk-shaped member, for example, the flywheel body 110 may be a member having another shape, such as a plate-shaped member having a polygonal shape. Moreover, the outer diameter of the flywheel body 110 is not particularly limited.

Furthermore, although the rotation shaft 120 is described as being formed of the shaft body 121 and the flange 122, which are separate components, the rotation shaft 120 may be formed as a single unit.

Furthermore, instead of being provided with the flange 122, the rotation shaft 120 may be provided with a step, such as a groove, formed along the outer periphery of the tip end of the shaft body 121. In this case, the protrusion 113e of the claw 113b may extend toward the groove.

Furthermore, although the flywheel 100 is described as being provided in the driving roller 24, the flywheel 100 may alternatively be provided in, for example, a rotating body including the first-transfer roller 21, the second-transfer roller 22, and the photoconductor drum 12.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A flywheel comprising:
a rotation shaft whose first end is supported by a rotating body;
a flywheel body that is provided at a second end of the rotation shaft and that is configured to rotate together with the rotation shaft; and
a protruding body that protrudes from a surface at a rotating-body side of the flywheel body and that extends in a circumferential direction of the rotation shaft,
wherein the protruding body includes:
an upright section that protrudes upright around the rotation shaft from the surface at the rotating-body side of the flywheel body toward the rotating body; and
an extending section that is provided at one end at the rotating-body side of the upright section and that extends from the one end toward the rotation shaft.

2. The flywheel according to claim 1,
wherein the rotation shaft includes a large diameter section that is provided at the second end and that has a size, in a radial direction of the rotation shaft, larger than another section of the rotation shaft.

3. The flywheel according to claim 2,
wherein the upright section protrudes from the surface at the rotating-body side of the flywheel body to the rotation-body side relative to the large diameter section in an axial direction of the rotation shaft.

4. The flywheel according to claim 2,
wherein the extending section is provided along an outer periphery of the rotation shaft and has an inner diameter that is larger than an outer diameter of the large diameter section.

5. A flywheel comprising:
a rotation shaft whose first end is supported by a rotating body;
a securing section that is provided at a second end of the rotation shaft and that secures a flywheel body; and
a hooking section that hooks the flywheel body to the rotation shaft in a state where the flywheel body is not secured to the rotation shaft by the securing section.

6. An image forming apparatus comprising:
a rotating body configured to rotate by receiving a driving force;
a rotation shaft whose first end is supported by the rotating body;
a flywheel that has a flywheel body and a protruding body, the flywheel body being provided at a second end of the rotation shaft and being configured to rotate together with the rotation shaft, the protruding body protruding from a surface at a rotating-body side of the flywheel body and extending in a circumferential direction of the rotation shaft; and
an image forming section configured to form an image onto a recording medium by utilizing rotation of the rotating body,
wherein the protruding body includes:
an upright section that protrudes upright around the rotation shaft from the surface at the rotating-body side of the flywheel body toward the rotating body; and an extending section that is provided at one end at the rotating-body side of the upright section and that extends from the one end toward the rotation shaft.

* * * * *